US005949373A

United States Patent [19]

Eslambolchi et al.

[11] Patent Number: 5,949,373

[45] Date of Patent: Sep. 7, 1999

[54] AUTOMATED CABLE INSTALLATION METHOD AND APPARATUS

[75] Inventors: Hossein Eslambolchi, Basking Ridge, N.J.; John Sinclair Huffman, McDonough, Ga.

[73] Assignee: AT & T Corp, New York, N.Y.

[21] Appl. No.: 09/089,827

[22] Filed: Jun. 3, 1998

[51] Int. Cl.[6] .......... H04B 7/185

[52] U.S. Cl. .......... 342/357.13; 37/367

[58] Field of Search .......... 37/367, 370, 904; 342/357.13

[56] References Cited

U.S. PATENT DOCUMENTS 5,576,973 11/1996 Haddy .......... 364/516

5,739,420 4/1998 Peterson .

*Primary Examiner*—Thomas H. Tarcza

*Assistant Examiner*—Devin Drummond

*Attorney, Agent, or Firm*—Robert B. Levy

[57] ABSTRACT

As an utility conveyance (12), such as a pipe or cable is buried, its location is accurately determined by a Global Positioning Satellite (GPS) Reading device (32) at the initial point of burial, and preferably, at successive lengths of the conveyance. A data logger (34) records the GPS location coordinates, as well as length measurement of the conveyance, to provide a permanent record of the location of the conveyance that is not require reference to any physical landmarks to enable re-location.

8 Claims, 1 Drawing Sheet

AUTOMATED CABLE INSTALLATION METHOD AND APPARATUS

TECHNICAL FIELD

This invention relates to a technique for automatically establishing the precise location of a cable or the like during underground burial.

BACKGROUND ART

Many providers of electric and telephone service (hereinafter, "utilities") often bury their pipes or cables (hereinafter, "conveyances") underground both for reasons of safety and esthetics. Often such utilities accomplish utility burial by plowing a trench in the earth, laying the conveyance in the trench, and thereafter covering the trench and conveyance with dirt. During the burial process, the utility typically records both the depth and location of the conveyance so that others seeking to excavate in the same general vicinity can locate the conveyance, thereby avoiding damage during such excavation. At present, utilities burying conveyances record their location relative to existing physical landmarks, such as roads, buildings, or bridges for example. From knowledge of the recorded distance of the conveyance from such a landmark, a contractor seeking to excavate in the general vicinity can locate the buried utility conveyance.

Unfortunately, utilizing a physical landmark as a reference point for locating a buried underground utility conveyance does not always facilitate accurate location of the conveyance. Occasionally, physical landmarks undergo a change. For example, a road may undergo widening or repair that may alter its relative distance to the buried utility conveyance. A building may undergo renovation or even demolition, precluding the ability to utilize such a structure as a point of reference for a location measurement.

Given that burial records may not often yield an accurate indication of the location of an underground utility conveyance, most utilities must physically locate their buried conveyances in order to effect a repair as well as to provide warnings to excavating contractors. Typically, a technician from the utility physically locates buried utility conveyances using a radio signal detector to detect a locating signal impressed on a conveyance of interest. As the technician gets closer to the buried utility conveyance, the locating signal received by the radio signal detector gets stronger. While "electronic" conveyance location in this manner does enable relatively accurate location of a buried conveyance, such location measurements are not infallible. If other underground conveyances are present in the same general vicinity as the buried conveyance of interest, the locating signals sometimes interfere with each other, making it difficult for a technician to know when the location signal detected by the radio signal detector is at its maximum.

U.S. Pat. No. 5,576,973, issued on Nov. 19, 1996, in the name of Alan Haddy, discloses the desirability of combining the electronic utility conveyance location technique discussed above with a Global Positioning Satellite (GPS) measurement system to precisely record the position where the technician electronically located the buried utility conveyance. As disclosed in the '973 patent, a technician first locates a buried object, such as a utility conveyance, using a radio signal detector. After locating the buried object, the technician then utilizes a GPS receiver to determine the positional coordinates of the cable located via radio signal detection to enable re-location of the object more precisely, rather than relying on a physical landmark as a reference point as was done previously. While the technique described in the '973 patent ostensibly facilitates more accurate re-location of a buried utility conveyance, the accuracy of the location measurement is dependent on the ability of the technician to precisely locate the buried utility conveyance electronically in the first instance. As discussed, locating a buried utility conveyance electronically via a radio signal detector does not always yield very high accuracy. Thus, if the position of the buried utility conveyance, as established by radio signal detection, is inaccurate, simply determining, via a GPS receiver, the exact position where the electronic location occurred will not necessarily improve the ability to accurately locate the conveyance.

Thus, there is need for a technique that accurately locates a buried utility conveyance.

BRIEF SUMMARY OF THE INVENTION

Briefly, the ability to accurately locate a buried utility conveyance, such as a cable or pipe, is improved by making at least one Global Positioning Satellite (GPS) measurement of the location of the conveyance during burial. In practice, a first location measurement is made at the initial point of burial (i.e., at the first conveyance end buried in the earth). Thereafter, a GPS location measurement is made at successive points along the conveyance, usually at discrete lengths, say every 50 or 100 feet or every 20 or 50 meters during burial, as well as or in addition to, a GPS measurement at the terminal end of the conveyance once buried. At such successive conveyance length, the conveyance length may be recorded along with the GPS location measurement.

Making a GPS location measurement of the conveyance during burial creates an infallible record for future use. The GPS measurement made during burial will virtually eliminate the need to undertake an electronic location of the conveyance after burial in order to facilitate a repair or to alert a contractor prior undertaking an excavation in the general vicinity of the conveyance.

DETAILED DESCRIPTION

Figure 1:
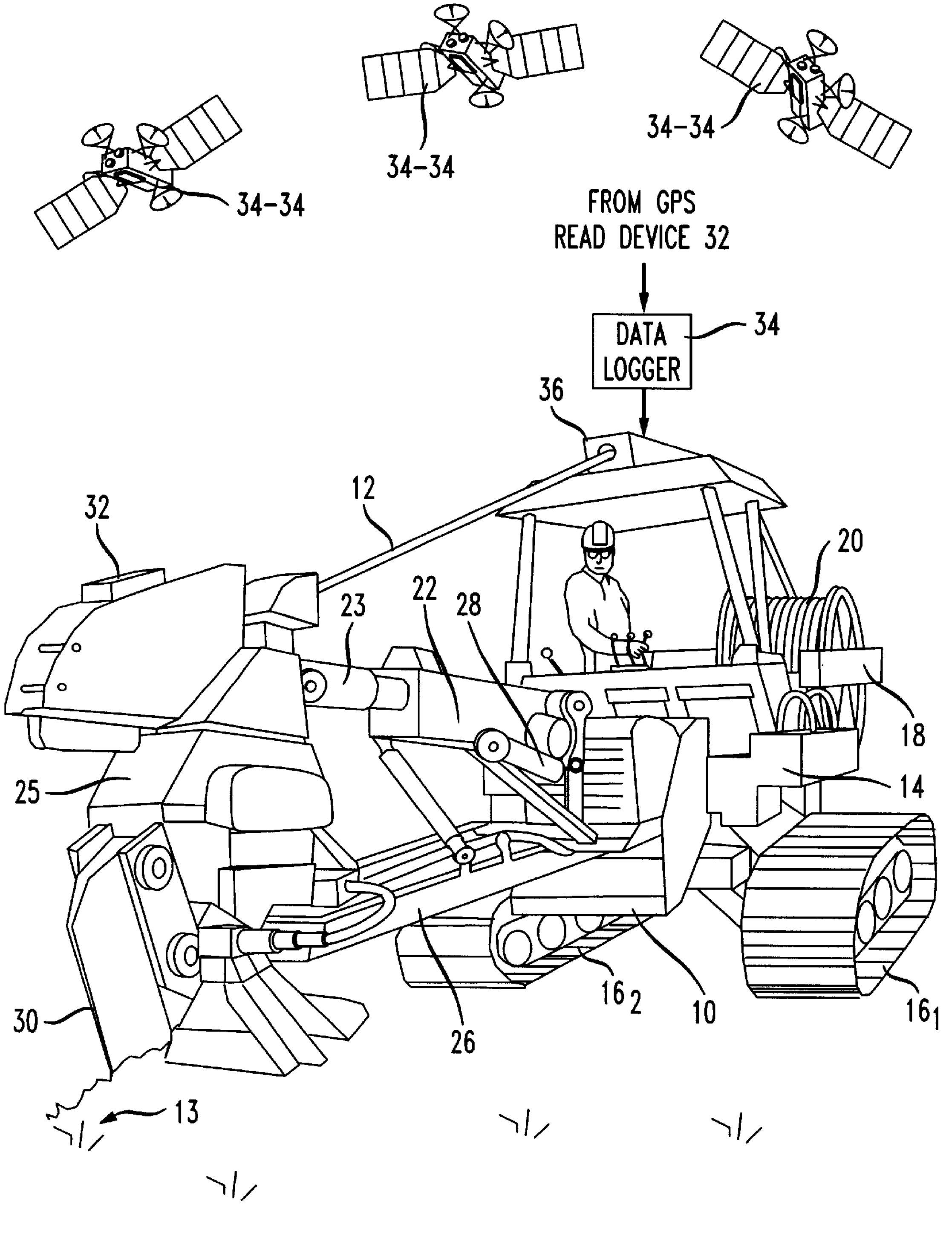
FIG. 1 depicts a perspective view of a cable installation machine for burying a cable while automatically determining the location of the buried cable in accordance with the invention.

FIG. 1 shows a machine 10 for burying a cable 12 in the earth 13. The machine 10 includes body 14 that is displaced along the earth 13 by a pair of parallel, spaced apart endless tracks $\mathbf{16}_1$ and $\mathbf{16}_2$ driven by an internal combustion engine (not shown). A pair of parallel, spaced-apart arms 18 (only one of which is shown) extend forward from the front of the machine 10. The arms 18 hold opposite ends of a shaft (not shown) that rotatably supports a reel 20 on which the cable 12 is wound.

An upper plow carriage support boom 22 extends rearward from the machine 10 for vertical pivotal movement relative to the machine. An arm 23 telescopes from the support boom 22 to connect the upper support boom to the upper end of a plow carraiage 25 into which the cable 12 is fed from the roll 20 in a direction that extends across the top of the machine 10. A lower plow carriage support 26 boom extends rearward from the machine 10 directly below the upper support boom for attachment to the lower portion of the plow carriage 25. A hydraulic cylinder 28 has its opposite ends connected to the upper plow carriage support boom 22 and the 10 to raise and lower the boom and with it, the plow carriage 25. The plow carriage 22 carries a depending cable plow 30 for:(1) cleaving the earth 13 to create a trench, (2) feeding cable 12 into the resultant trench; and (3) covering the trench with dirt, as the machine 10 moves along the earth 13.

Heretofore, the location of the cable 10 buried by the machine 12 was recorded by reference to one or more physical landmarks, such as a road, bridge, building or other such object (not shown). Unfortunately, the location of such reference points can and do change as a result of natural causes, such as floods, hurricanes or the like, or as a result of a man-made change, such as repair or even removal. In accordance with the invention, the location of the cable 12 buried by the machine 10 is accurately established by at least one, and preferably, a plurality of a Global Position Satellite (GPS) position measurements. To facilitate such measurements, the plow carriage 25 mounts a GPS reading device 32, typically at its top. The GPS reading device 32 typically takes the form of a GPS receiver, as are available from a variety of manufacturers, such as Garmin Industries.

In operation, the GPS reading device 32 receives information broadcast by three or more geo-positional satellites 34-34. The satellites 34-34 broadcast information from on-board atomic clocks, which the GPS reading device 32 compares to its own clock data. From the time difference, the GPS reading device 32 calculates its own position, and hence, that of the cable 12 very accurately. A data logger, 34, in the form of a data recorder or a personal computer with a mass storage device, such as a magnetic disk drive, records the location coordinates computed by the GPS reading device 32.

The GPS reading device 32 makes at least one location measurement, typically at the initial point of burial of the cable 12 for recording by the data logger 34. Preferably, the GPS reading device 32 makes a location measurement at each of a plurality of successive lengths of the cable 12 during burial, as well as the terminal point of cable burial. To this end, the data logger 34 receives signals from a cable length measuring device 36 across which the cable passes from the cable reel 20 into the plow carriage 25. As depicted in FIG. 1, the cable length measuring device 36 mounts on the roof of the machine 10 but could be located elsewhere. The cable length measuring device 36 provides the data logger 34 with indication when a prescribed length of cable, say 50 or 100 feet or 10 or 50 meters, has passed over the measuring device into the plow carriage 25 for burial. In this way, the data logger 34 can record the cable location information for each successive length of cable to enable accurate location of the cable from beginning to end. To this end, a utility may provide markers (not shown) along the cable right-of-way to provide a visual indication of such location measurements.

The cable location information recorded by the data logger 34 provides a permanent record of the cable location that remains invariant notwithstanding any changes in any surrounding landmarks. As long as the position of the cable does not shift from that recorded by the data logger 34 during burial, the cable location is known at all times, obviating the need to electronically locate the cable each time maintenance is required or excavation is anticipated. Further, the location of the cable at successive cable lengths can provide a technician with valuable information tool for performing fault location.

The foregoing provides a technique for accurately determining the location of an underground utility conveyance during burial.

What is claimed is:

1. A method for accurately locating a buried utility conveyance, comprising the step of:

burying the conveyance while;

making at least one global positioning satellite location measurement of the location of the conveyance during burial.

2. The method according to claim 1 wherein the location measurement is made at an initial point of conveyance burial.

3. The method according to claim 1 wherein the location measurements are made at successive points along the conveyance during burial.

4. The method according to claim 3 wherein a cable length indication is made at each location measurement.

5. The method according to claim 2 wherein a second location measurement is made at a terminal point of burial.

6. Apparatus for burying a conveyance comprising:

a machine movable along the earth:

a plow carried by the machine for (1) cleaving the earth to create a trench, (2) feeding the conveyance into the resultant trench; and (3) covering the trench with dirt, as the machine moves along the earth;

a Global Positioning Satellite (GPS) Reading device for establishing the location of the conveyance during burial;

a data logger for recording the location of the conveyance as established by the GPS reading device.

7. The apparatus according to claim 6 wherein the GPS reading device makes location measurements at successive points along the conveyance during burial.

8. The apparatus according to claim 6 further including a conveyance length measuring device coupled to the data logger for providing an indication when prescribed length of cable has been buried.

* * * * *